United States Patent [19]

Fletcher et al.

[11] 3,818,346

[45] June 18, 1974

[54] DIFFERENTIAL PHASE-SHIFT-KEYED SIGNAL RESOLVER

[76] Inventors: James C. Fletcher, Administrator of the National Aeronautics and Space Administration with respect to an invention by; Phillip M. Hopkins, Houston; Wally M. Wallingford, Kemah, both of Tex.

[22] Filed: Oct. 12, 1972

[21] Appl. No.: 297,127

[52] U.S. Cl. .................................. 325/320, 178/88
[51] Int. Cl. ............................................ H04b 1/16
[58] Field of Search ........... 178/67, 88; 325/30, 320

[56] References Cited

UNITED STATES PATENTS

| | | | |
|---|---|---|---|
| 3,524,023 | 8/1970 | Whang | 178/67 |
| 3,590,381 | 6/1971 | Ragsdale | 178/67 |
| 3,619,503 | 11/1971 | Ragsdale | 178/67 |
| 3,643,023 | 2/1972 | Ragsdale | 325/320 |

*Primary Examiner*—Albert J. Mayer
*Attorney, Agent, or Firm*—Marvin J. Marnock; John R. Manning; Marvin F. Matthews

[57] ABSTRACT

A differential phase shift keyed (DPSK) signal resolver resolves the differential phase shift in the incoming signal to determine the data content thereof overcoming phase uncertainty without requiring a transmitted reference signal.

7 Claims, 5 Drawing Figures

DIFFERENTIAL PHASE-SHIFT-KEYED SIGNAL RESOLVER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

CROSS-REFERENCE TO RELATED APPLICATIONS

The receiver of the present invention may be used as a receiver of signals in the quadriphase DPSK transmission system disclosed in our co-pending patent application "Differential Phase-Shift-Keyed Communication System," Ser. No. 297,128, filed of even date herewith, or with other DPSK communication systems.

BACKGROUND OF THE INVENTION

1. Field of the Invention

The present invention relates to differential phase-shift-keyed signal resolvers.

2. Description of Prior Art

Prior art differential phase-shift-keyed signal receivers required an incoming phase reference signal, in addition to the data, in the incoming signal in order that the phase of the incoming signal could be determined. The added phase reference signal increased the required signal power, and decreased the signal to noise ratio of the data content of the signal.

Further, attempts to derive a phase reference signal from the incoming data were unsatisfactory. Since the incoming data assumed any one of four possible phases relative to the locally derived phase reference signal, an ambiguity as to the data content of the signal resulted, which was undesirable.

SUMMARY OF INVENTION

Briefly, the present invention provides a new and improved DPSK signal receiver which responds to phase shifts in an incoming signal to provide output data bits. In the receiver, a local phase reference signal is derived from the incoming signal and is used in demodulating the incoming signal to form a phase status signal. Decision logic circuitry compares the phase status signal currently received with the phase status signal received during a preceding reception interval and thus decodes the phase status signal to form output data bits.

The present invention further provides a communications receiver for deriving output data bits from an incoming phase-shift-keyed signal having four possible phases, but having no phase reference signal transmitted therewith. A local phase reference signal is derived from the incoming signal and phase-shifted to a phase intermediate two of the four possible phases. The phase-shifted local phase reference signal is then used to demodulate the incoming signal to detect the phase difference between the phase-shifted local reference signal and the incoming signal. Logic circuitry responds to the phase difference so detected and removes phase ambiguity between the local phase reference signal and the incoming signal.

It is an object of the present invention to provide a new and improved quadriphase DPSK receiver.

It is another object of the present invention to provide a communications receiver for DPSK signals without requiring a phase reference signal to accompany the received DPSK signals.

BRIEF DESCRIPTION OF THE DRAWINGS

FIG. 5 is a voltage phasor diagram of signals present in the receiver of FIG. 1.

DESCRIPTION OF THE PREFERRED EMBODIMENT

Figure 1:
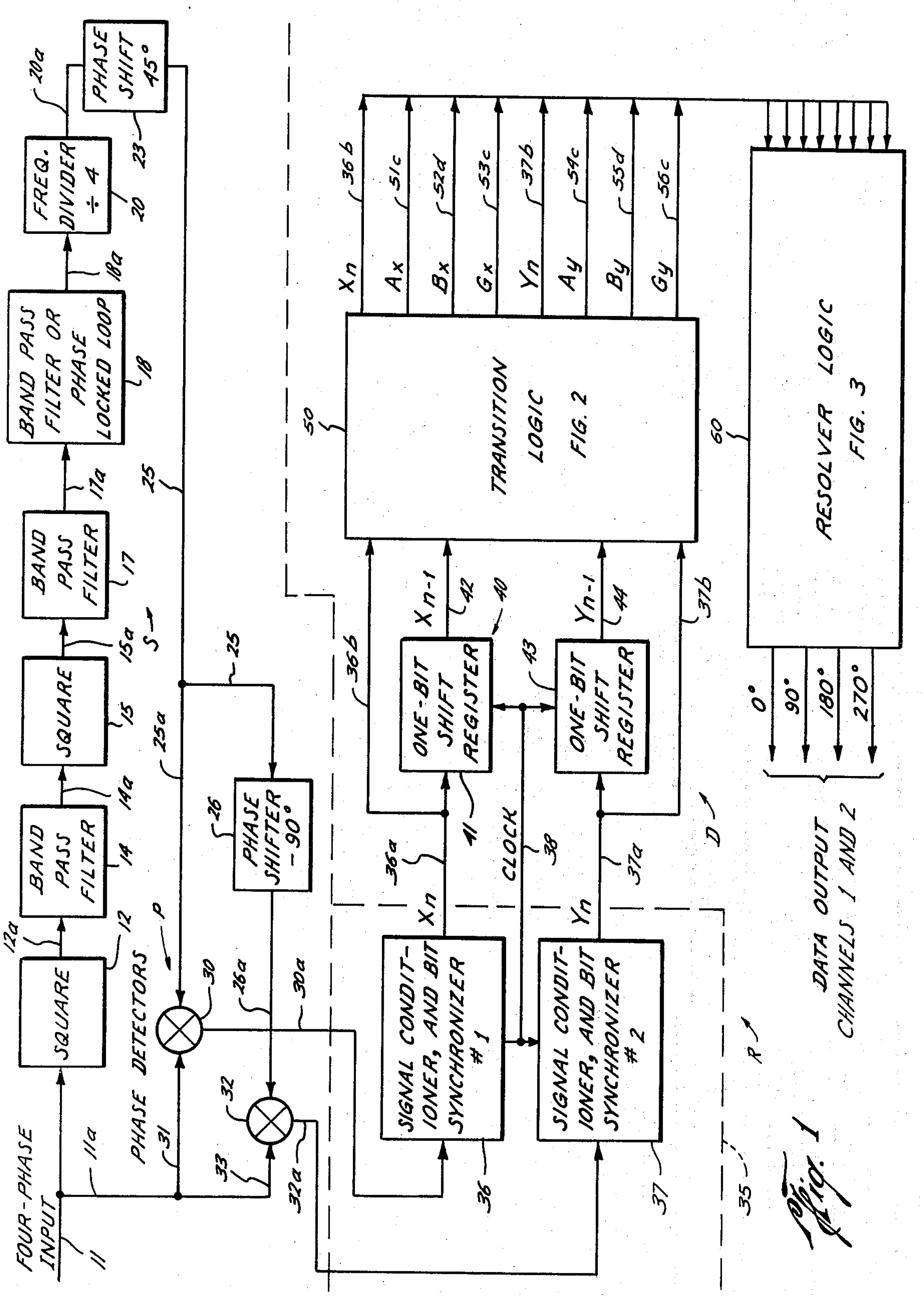
FIG. 1 is a schematic electrical circuit diagram of the receiver of the present invention.

In the drawings, the letter R designates generally the quadriphase differential phase-shift-keyed (DPSK) signal receiver of the present invention. The receiver R responds to phase shifts in an incoming signal to provide output data bits. A signal processing circuit S derives a local phase reference signal from the incoming signal. The local phase reference signal from the signal processing circuit S is furnished to phase detector demodulator circuit P which demodulates the incoming signal with the local phase reference signal to form a phase status signal.

The phase status signal from the phase detector demodulator circuit P is provided to a decoding decision logic circuit D which responds and forms output data bits by decoding the phase status signal. Changes in the phase status signal between successive reception intervals indicate data in the incoming signal. The decoding circuit D compares the phase status signal currently being formed by the phase detector demodulator circuit P with the phase status signal formed during the preceding reception interval and forms output data bits based on changes in the phase status signal, as will be set forth below.

The signal processing circuit S receives the incoming signal, which may have one of the four phases in accordance with the data content thereof, over an input conductor 11. The input conductor 11 may be connected to a telephone or telegraph communications system or to an antenna to receive a radio signal or other suitable signal.

The signal processing circuit S operates on the "times four loop" principle, in which an unmodulated phase reference signal is derived by multiplying the input signal times four in frequency, with four corresponding to the number of possible phases in the incoming signal on the input conductor 11.

A first squaring circuit 12, which may be a conventional square law detector, forms an output signal at twice the frequency of the incoming signal. The squaring circuit 12 is connected over a conductor 12*a* to a band pass filter 14. The band pass filter 14 has a center frequency at twice the frequency of the incoming signal on the input conductor 11, providing an output signal over a conductor 14*a* having twice the frequency of the incoming signal.

A second squaring circuit 15, which is also a conventional square law detector, forms an output signal at four times the frequency of the incoming signal and provides such signal over a conductor 15*a* to a band pass filter 17.

The band pass filter 17 has a center frequency at four times the frequency of the incoming signal on the conductor 11, and accordingly provides an output signal over a conductor 17*a* having a frequency four times the frequency of the incoming signal.

A frequency stabilization circuit 18 is electrically connected to the conductor 17*a* to maintain the times four frequency formed by the signal processing circuit S stable. The frequency stabilization circuit 18 may be a band pass filter having a center frequency at four times the frequency of the incoming signal, or a conventional phase locked loop circuit to stabilize the times four frequency formed in the signal processing circuit S.

The times four frequency signal is provided over an output conductor 18*a* from the frequency stabilization circuit 18 to a conventional frequency divider circuit 20. The frequency divider circuit 20 divides the frequency of the times four frequency signal from the circuit 18 by a factor of four, providing a local phase reference signal derived from the incoming signal and having a like frequency to the incoming signal on the input conductor 11. The local phase reference signal is provided by the frequency divider circuit 20 over an output conductor 20*a*.

It should be noted that the signal processing circuit S, in deriving the local phase reference signal from the incoming signal, creates a phase ambiguity. The incoming signal on the conductor 11 may have one of four possible phases, as indicated in FIG. 5. The incoming signal may be in phase with a first phasor 21*a*, or with one of two phasors 21*b* and 21*c* in phase quadrature with the phasor 21*a*, or in phase with a phasor 21*d*, in phase quadrature with each of the phasors 21*b* and 21*c* and 180° out of phase with the phasor 21*a*. The receiver R derives output data bits from the incoming signal in the absence of an accompanying transmitted phase reference signal and resolves the phase ambiguity between the local phase reference signal and the incoming signal, as will be set forth below.

A first phase shift network 23 shifts the phase of the local reference signal from the frequency divider 20 to form a first local phase reference signal having a phase intermediate two of the four possible phases of the incoming signal. A phasor 24*a* (FIG. 5) indicates the first local phase reference signal intermediate the phasors 21*a* and 21*b*. It should be understood, however, that the phasor 24*a* is for the purposes of example and that the phase shift network may form a phase shifted local phase reference signal having a phase intermediate other adjacent pairs of the phasors 21*a*, 21*b*, 21*c* and 21*d*, if desired.

An output conductor 25 electrically connects the phase shift network 23 to a second phase shift circuit 26 which forms a second local phase reference signal in phase quadrature with the first local phase reference signal on the conductor 25, as indicated by a phasor 24*b* (FIG. 5).

The first phase shifted local phase reference signal is provided by an extension 25*a* of the conductor 25 to a first phase detector 30 of the phase detector demodulator circuit P. The phase detector 30 receives the incoming signal from the input conductor 11 over a conductor 11*a* and a conductor 31. The phase detector 30 is a conventional circuit and provides a positive output signal level when the incoming signal on the conductor 31 and the first phase shifted local reference signal on the conductor 25*a* are within + or − 90° in phase with each other. The phase detector 30 provides a negative level output signal when the incoming signal on the conductor 31 and the first phase shifted local reference signal on the conductor 25*a* are more than 90° out of phase with each other.

An output conductor 26*a* provides the second phase shifted local phase reference signal from the phase shift network 26 to a second phase detector 32 of the phase detector demodulator circuit P. A conductor 33 provides the incoming signal from the conductor 11*a* and the input conductor 11 to the phase conductor 32. The phase conductor 32 provides a positive level output signal when the incoming signal and the second phase shifted local phase reference signal are within 90° in phase with each other, and a negative level output signal when the incoming signal and the second phase shifted local phase reference signal are more than 90° out of phase with each other.

In this manner, the phase detector demodulator circuit P demodulates the incoming signal with the local phase reference signal and forms a first phase status signal in the phase detector 30 indicating the phase relaionship between the first phase shifted local phase reference signal and the incoming signal. The first phase status signal formed in the phase detector 30 is provided over an output conductor 30*a* to a signal conditioner and bit synchronizer circuit 35.

The second phase detector 32 demodulates the incoming signal with the second phase shifted local phase reference signal and forms a second phase status signal whose level indicates the phase relationship between the incoming signal and the second phase shifted local phase reference signal. The second phase status signal is provided over an output conductor 32*a* from the phase detector 32 to the signal conditioner circuit 35.

The signal conditioner circuit 35 includes a first signal conditioner and its synchronizer unit 36 responsive to the first phase status signal on the conductor 30*a* and a second signal conditioner and bit synchronizer circuit 37 responsive to the second phase status signal on the output conductor 32*a*. The signal conditioner and bit synchronizer circuits 36 and 37 are conventional and convert the phase status signals to voltage levels compatible with the decoding decision logic circuit D. An EMR Model 2726–02 PCM signal conditioner and Model 2727 Selector Module is one commercial model which could be used for the signal conditioner circuit 36 or 37. The signal conditioner circuit 36 and 37 provide signals over output conductors 36*a* and 37*a*, respectively, in response to the phase status signals. The signal conditioner units 36 and 37 respond to a positive phase status signal and indicate a logic "0" level. The signal conditioner units 36 and 37 respond to a negative phase status signal and provide a logic "1" output signal over the output conductors 36 and 37.

The signal conditioner and bit synchronizer circuit 36 provides a clock pulse wave form 100 (FIG. 4) over a conductor 38 to the signal conditioner and bit synchronizer unit 37 and to the decoding decision logic circuit D in order to maintain a synchronism therebetween. The time interval between successive clock pulses in the waveform 100 defines a reception interval during which a phase status signal is formed and provided by the signal conditioner circuits 36 and 37 over the conductors 36*a* and 37*a*. The signal on the conductor 36*a* for the current reception interval is designated $X_n$, while the signal on the conductor 37*a* during the current reception interval is designated $Y_n$.

The decoding decision logic circuit D of the receiver R includes a storage circuit 40 for storing the phase status signal formed during the preceding reception interval, a transition logic circuit 50 which detects changes in the phase status signal currently formed from the stored phase status signal in the storage circuit 40, and a resolver logic circuit 60 which forms output data bits based on changes in the phase status signal detected by the transition logic circuit 50.

The storage circuit 40 includes a first one-bit shift register 41 electrically connected to the conductor 36*a* to receive and store the first phase status signal formed during the preceding reception interval. The shift register 41 stores the first phase status signal formed during the preceding reception interval when energized by a clock pulse of the waveform 100, and provides the stored first phase status signal over an output conductor 42 to the transition logic circuit 50. The stored first phase status signal in the shift register 41 is indicated by $X_{n-1}$ in the accompanying drawings.

A second one-bit shift register 43 of the storage circuit 40 receives the second phase status signal over the conductor 37*a* and stores such signal when energized by the clock pulse on the conductor 38 in order to provide the second phase status signal formed during the preceding reception interval over an output conductor 44 to the transistion logic circuit 50.

Considering the transition logic circuit 50 in detail, such circuit receives the stored phase status signals $X_{n-1}$ and $Y_{n-1}$ over the conductors 42 and 44 and the current phase status signals $X_n$ and $Y_n$ over an input conductor 36*b* and an input conductor 37*b*, respectively. The transition logic circuit 50 detects changes in the current phase status signals $X_n$ and $Y_n$ from the stored phase status signals $X_{n-1}$ and $Y_{n-1}$ and provides status change signals to the resolver logic circuit 60 so that output data bits may be formed therein.

A first AND gate 51 (FIG. 2) of the transition logic circuit 50 receives the current phase signal $X_n$ over an input conductor 51*a*. An inverting input terminal 51*b* of the AND gate 51 receives the stored phase status signal $X_{n-1}$ from the input conductor 42. The AND gate 51 provides an output signal $A_x$ at an output conductor 51*c* to the resolver logic circuit 60. The signal $A_x$ is formed by the AND gate 51 in accordance with the following equation:

$$A_x = X_n \cdot \bar{X}_{n-1} \quad (1)$$

Figure 2:
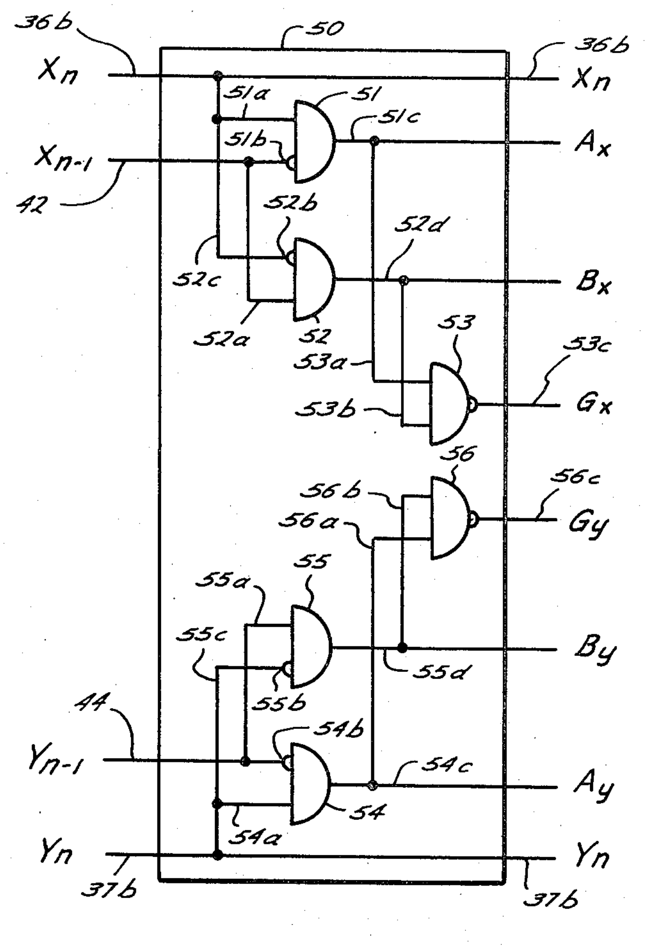
FIGS. 2 and 3 are schematic electrical circuit diagrams of portions of the receiver of FIG. 1.

The conductor 36*b* passes through the transition logic circuit 50 and provides the current phase status signal $X_n$ to the resolver logic circuit 60 (FIGS. 1 and 2).

A second AND gate 52 receives the stored phase status signal $X_{n-1}$ over an input conductor 52*a* from the conductor 42. An inverting input terminal 52*b* receives the current phase status signal $X_n$ from the conductor 36*b* over an input conductor 52*c*. The AND gate 52 provides a phase status change signal $B_x$ over an output conductor 52*d* to the resolver logic circuit 60 in accordance with the following equation:

$$B_x = \bar{X}_n \cdot X_{n-1}. \quad (2)$$

A NAND gate 53 is electrically connected by an input conductor 53*a* to the conductor 51*c* to receive the phase status change signal $A_x$. A second input conductor 53*b* provides the phase status change signal $B_x$ from the conductor 52*d* to the NAND gate 53. The NAND gate 53 provides a phase status change signal $G_x$ over an output conductor 53*c* to the resolver logic circuit 60 in accordance with the following equation:

$$G_x = \overline{A_x + B_x} \quad (3)$$

An AND gate 54 of the resolver logic circuit 50 receives the current phase status signal $Y_n$ from the conductor $37_b$ over an input conductor $54_a$. An inverting input $54_b$ of the AND gate 54 receives the stored phase status signal $Y_n$–1 from the conductor 44. The AND gate 54 provides a phase status change signal $A_y$ over an output conductor $54_c$ to the resolver logic circuit 60 in accordance with the following equation:

$$A_y = Y_n \cdot \bar{Y}_n - 1 \quad (4)$$

An AND gate 55 receives the stored phase status signal $Y_n$–1 over an input conductor 55*a* from the conductor 44. An inverting input 55*b* of the AND gate 55 receives the current phase status signal $Y_n$ from the conductor 37*b* over a conductor 55*c*. The AND gate 55 provides an output signal $B_y$ over an output conductor 55*d* to the resolver logic circuit 60 in accordance with the following equation:

$$B_y = \bar{Y}_n \cdot Y_n - 1 \quad (5)$$

An input conductor 56*a* electrically connects the conductor 54*c* to a NAND gate 56 in order to provide the phase status change signal $A_y$ thereto. A second input conductor 56*b* provides the phase status change signal $B_y$ from the conductor 55*d* to the NAND gate 56. The NAND gate 56 accordingly forms an output signal $G_y$ and provides such signal over an output conductor 56*c* to the resolver logic circuit 60 in accordance with the following equation:

$$G_y = \overline{A_y + B_y} \quad (6)$$

The conductor 37*b* passes through the transition logic circuit 50 and provides the current phase status signal $Y_n$ to the resolver logic circuit 60.

Figure 3:
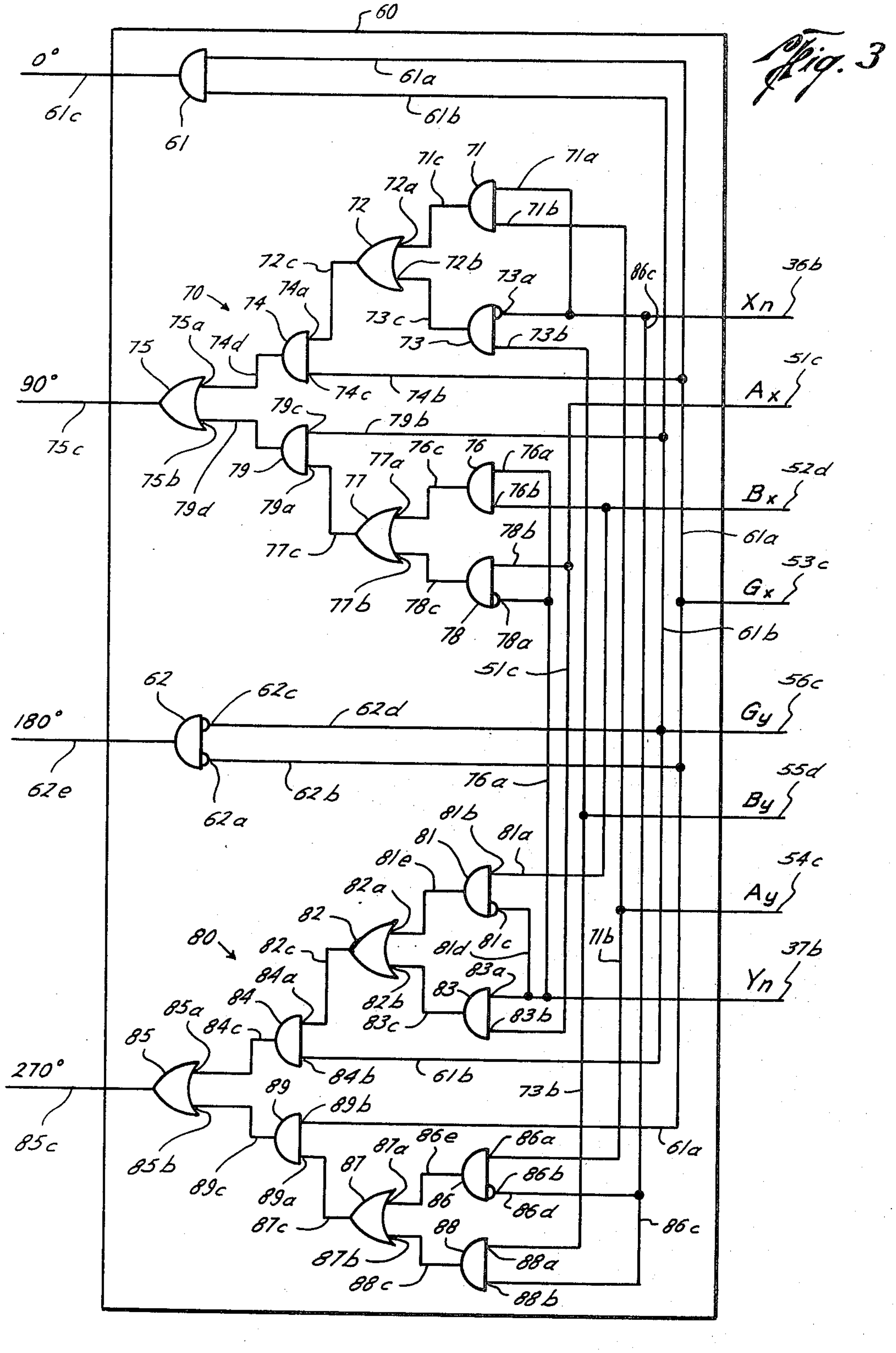

The resolver logic circuit 60 (FIGS. 1 and 3) receives the current phase status signals $X_n$ and $Y_n$ and the phase status change signals $A_x$, $B_x$, $G_x$, $A_y$, $B_y$ and $G_y$ from the transition logic circuit 50 and forms phase shift indicator signals which can be coded into output data bits based on changes in the phase status signal detected by the transition logic circuit 50 and indicated by the phase status change signals. The output data bits are assigned in accordance with the coding performed at the sending transmitter. A suitable transmitter is disclosed in our copending application previously referenced where 0° phase shift indicates data bits "00;" 90° phase shift indicates data bits "01;" 180° phase shift indicates data bits "10;" and 270° phase shift indicates data bits "11."

A 0° AND gate 61 is electrically connected by an input conductor 61*a* to the conductor 53*c* to receive the phase status change signal $G_x$ and input conductor 61*b* provides the phase status change signal $G_y$ to the 0° AND gate 61. The AND gate 61 provides an output signal over an output conductor 61*c* when both the current phase status signals $X_n$ and $Y_n$ have not changed from the preceding reception interval, as detected by the transition logic circuit 50 and so indicated to the resolver logic 60 by a logic "1" in both phase status change signals $G_x$ and $G_y$. The resolver logic circuit 60 accordingly forms a 0° output signal and provides such output signal indicating data bits "00" due to the absence of a phase shift between the current reception interval and the preceding reception interval in accordance with the following logic equation:

$$0° = G_x \cdot G_y \quad (7)$$

A 180° AND gate 62 receives the phase status change signal $G_x$ at an inverting input 62*a* thereof from a conductor 62*b* and the conductor 61*a*. A second inverting input 62*c* of the AND gate 62 receives the phase status change signal $G_y$ over a conductor 62*d* from the conductor 61*b*. The AND gate 62 provides a 180° phase change output signal over an output conductor 62*e* when both the current phase status signals $X_n$ and $Y_n$ change from the stored phase status signals $X_{n-1}$ and $Y_{n-1}$, as detected by the transition logic circuit 50 and indicated by a logic "0" level of phase status change signals $G_x$ and $G_y$. The resolver logic circuit 60 accordingly provides the 180° output signal indicating data bits "10" in the incoming signal in accordance with the following equation:

$$180° = \overline{G_x} \cdot \overline{G_y} \quad (8)$$

A 90° logic circuit 70 of the resolver logic circuit 60 forms a 90° output signal indicating data bits "01" based on a 90° change in the incoming signal from the preceding reception interval. The logic circuit 70 forms the 90° logic signal based on the phase status change signals from the transition logic circuit 50 in accordance with the following equation:

$$90° = G_x \cdot [(X_n \cdot A_y) + (\overline{X}_n \cdot B_y)] + G_y \cdot [(Y_n \cdot A_x) + (\overline{Y}_n \cdot B_x)] \quad (9)$$

A first AND gate 71 of the 90° logic circuit 70 receives the current phase status signal $X_n$ over an input conductor 71*a* from the conductor 36*b*. A second conductor 71*b* provides the phase change status signal $A_y$ from the conductor 54*c* to the AND gate 71. The AND gate 71 provides a logic "1" signal over an output conductor 71*c* to a first input 72*a* of an OR gate 72 when both the current phase status signal $X_n$ and the phase change status signal $A_y$ are logic "1."

An AND gate 73 receives the current phase status signal $X_n$ at an inverting input 73*a* thereof. An input conductor 73*b* provides the phase status change signal $B_y$ from the input conductor 55*d* to the AND gate 73. The AND gate 73 provides an output logic "1" signal over an output conductor 73*c* to a second input 72*b* of the OR gate 72 when the current phase status signal $X_n$ is logic "0" and the phase change status signal $B_y$ is logic "1." The OR gate 72 provides a logic "1" signal over an output conductor 72*c* when either of the input terminals 72*a* or 72*b* receives a logic "1" input.

The conductor 72*c* is electrically connected at a first input 74*a* of an AND gate 74. An input conductor 74*b* provides the phase status change signal $G_x$ on the conductor 61*a* to a second input 74*c* of the AND gate 74. An output conductor 74*d* of the AND gate 74 is electrically connected to a first input 75*a* of an OR gate 75.

An AND gate 76 is electrically connected by an input conductor 76*a* to receive the current phase status signal $Y_n$ from the conductor 37*b*. A second input terminal 76*b* of the AND gate 76 receives the phase status change signal $B_x$ from the conductor 52*d*. The AND gate 76 provides a logic "1" signal over an output 76*c* thereof when the current phase status signal $Y_n$ and the phase status change signal $B_x$ are both logic "1." The output conductor 76*c* is electrically connected to an OR gate 77 at a first input 77*a* thereof.

An AND gate 78 receives the current phase data signal $Y_n$ from the conductor 76*a* at an inverting input 78*a* thereof. An input conductor 78*b* provides the phase status change signal $A_x$ from the conductor 51*c* to the AND gate 78. An output conductor 78*c* of the AND gate 78 provides a logic "1" signal to a second input 77*b* of the OR gate 77 when the phase status change signal $A_x$ is logic "1" and the current phase status signal $Y_n$ is logic "0." An output terminal 77*c* of the OR gate 77 is accordingly logic "1" when either of the input terminals 77*a* and 77*b* thereof receive logic "1" signals from the AND gate 76 and 78, respectively. The output conductor 77*c* is electrically connected to an AND gate 79 at a first input 79*a* thereof.

An input conductor 79*b* provides the phase status change signal $G_y$ from the conductor 61*d* to a second input 79*c* of the AND gate 79. An output conductor 79*d* of the AND gate 79 is electrically connected to a second input 75*b* of the OR gate 75. Accordingly, an output conductor 75*c* of the OR gate 75 of the 90° logic circuit 70 in the resolver logic circuit 60 provides a logic "1" output signal in accordance with equation (9) set forth above to indicate data bits "01" in the incoming signal as indicated by a 90° phase shift therein.

A 270° logic circuit 80 of the resolver logic circuit 60 forms a 270° output signal indicating data bits "11" in the incoming signal as designated by a 270° phase shift in the incoming signal. The 270° logic circuit 80 forms the 270° output signal indicating data bits "11" in accordance with the following equation:

$$270° = G_x[(X_n \cdot B_y) + (\overline{X}_n \cdot A_y)] + G_y[(Y_n \cdot A_x) + (\overline{Y}_n \cdot B_x)] \quad (10)$$

An AND gate 81 of the 270° logic circuit 80 receives the phase status change signal $B_x$ from the conductor 52*d* over an input conductor 81*a* at a first input terminal 81*b* thereof. An inverting input terminal 81*c* of the AND gate 81 is electrically connected to the conductor 37*b* by a conductor 81*d* to receive the current phase status signal $Y_n$. The AND gate 81 provides a logic "1" output signal over an output conductor 81*e* when the phase status change signal $B_x$ is a logic "1" and the phase status signal $Y_n$ is a logic "0." The output conductor 81*e* is electrically connected to an OR gate 82 at a first input terminal 82*a* thereof.

An AND gate 83 receives the current phase status signal $Y_n$ from the conductor 37*b* at a first input 83*a* thereof. A second input terminal 83*b* of the AND gate 83 receives the phase status change signal $A_x$ from the conductor 51*c*. The AND gate 83 provides a logic "1" output signal over an output conductor 83*c* to a second input 82*b* of the OR gate 82 when the current phase status signal $Y_n$ and the phase status change signal $A_x$ are both logic "1" levels.

The OR gate 82 provides an output logic "1" signal over an output conductor 82*c* to a first input 84*a* of an AND gate 84 when either of the input terminals 82*a* and 82*b* receive logic "1" signals from the AND gates 81 and 83, respectively.

A second input terminal 84*b* of the AND gate 84 receives the phase status signal $G_y$ from the conductor 61*a*. An output conductor 84*c* of the AND gate 84 provides a logic "1" signal to a first input 85*a* of an OR gate 85 when both input terminals 84*a* and 84*b* are receiving logic "1" signals.

An AND gate 86 receives the phase status change signal $A_y$ from the conductor 71*b* at an input terminal 86*a*. An inverting input terminal 86*b* of the AND gate 86 receives the current phase status signal $X_n$ from the conductor 36*b* over input conductors 86*c* and 86*d*.

The AND gate 86 provides a logic "1" signal over an output conductor 86*e* to a first input 87*a* of an OR gate 87 when the phase status change signal $A_y$ is logic "1" and the current phase status signal $X_n$ is logic "0."

An AND gate 88 receives the phase status change signal $B_y$ from the conductor 73*b* at an input terminal 88*a* thereof. A second input terminal 88*b* of the AND gate 88 receives the current phase status signal $X_n$ from the input conductor 86*c*. The AND gate 88 provides a logic "1" output signal over an output conductor 88*c* to a second input terminal 87*b* of the OR gate 87 when both input terminals 88*a* and 88*b* receive logic "1" signals.

The OR gate 87 provides a logic "1" signal at an output conductor 87*c* thereof when either of the input terminals 87*a* and 87*b* receives a logic "1" signal from the AND gates 86 and 88, respectively.

An AND gate 89 receives the output signal from the OR gate 87 at an input terminal 89*a* thereof. A second input 89*b* of the AND gate 89 receives the phase status change signal $G_x$ over the conductor 61*a*. An output conductor 89*c* of the AND gate 89 is electrically connected to a second input 85*b* of the OR gate 85. The OR gate 85 accordingly receives the output from the AND gate 89. The OR gate 85 provides a logic "1" output signal over an output conductor 85*c* when either of the input terminals 85*a* and 85*b* thereof receive logic "1" input signals.

Thus, the 270° logic circuit 80 of the resolver logic circuit 60 forms a 270° output signal indicating data bits "11" based on a 270° phase shift in the incoming signal in accordance with equation (10) set forth above.

Figure 4:
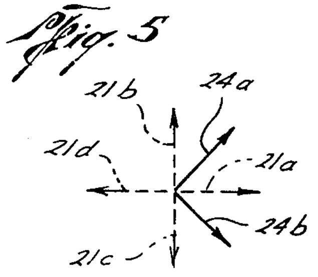
FIG. 4 is a voltage waveform diagram of signals present in the receiver of FIG. 1 during the operation thereof.
Figure 4:
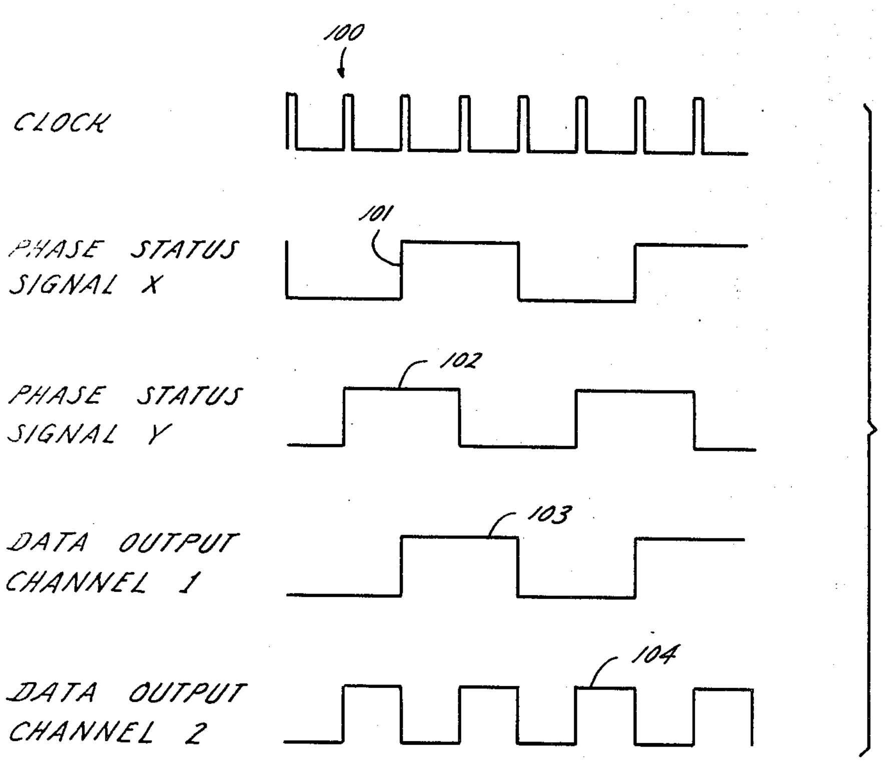

In the operation of the present invention, the incoming quadriphase differential phase shift keyed signal to the receiver R is received at the input conductor 11. The signal processing circuit S derives a local phase reference signal from the incoming signal and provides the local phase reference signal to the phase detectors 30 and 32. The phase detectors 30 and 32 demodulate the incoming signal by the local phase reference signal to form a phase status signal. The signal conditioner 35 adjusts the phase status signal from the detectors 30 and 32 to the compatible logic levels for the decoding decision logic circuitry D. Example phase status signals are shown in the accompanying drawings at 101 and 102 (FIG. 4). The phase status signal A forms 101 and 102 are provided to the storage circuit 40 of the decoding circuit D. The transition logic circuit 50 of the decoding logic circuit D detects changes in the phase status signals, as has been set forth and provides phase status change signals to the resolver logic circuit 60, which forms output signals indicating data bits, as indicated by the waveforms 103 and 104 (FIG. 4) based on changes in the phase status signal detected by the transition logic circuit 50.

In this manner, the receiver R derives output data bits from an incoming phase shift keyed signal having four possible phases in the absence of an accompanying transmitted phase reference signal, removing phase ambiguity between the local phase reference signal and the incoming signal.

It should be understood that the gating circuitry in the transition logic circuit 50 and the resolver logic circuit 60 are set forth as a preferred embodiment, and that other gating circuitry equivalent to same to perform the logic operations of equations (1) through (10) may be used, if desired.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

We claim

1. A quadriphase differential phase-shift-keyed signal receiver responding to phase shifts in an incoming signal to provide output data bits, comprising:

a. means for deriving a local phase reference signal from the incoming signal;

b. phase detector means for demodulating the incoming signal by the local phase reference signal to form a phase status signal;

c. decision logic means responsive to said phase detector means for forming phase change signals indicating output data bits by decoding the phase status signal, said decision-logic means comprising;

d. means for storing the phase status signal formed during the preceding reception interval;

e. transition logic means for detecting changes in the phase status signal currently formed from the stored phase status signal; and f. resolver logic means for forming output signals indicating data bits based on changes in the phase status signal detected by said transition logic means.

2. The structure of claim 1, wherein said transition logic means comprises:

logic circuit means for forming an output signal when the phase status signal currently being formed changes from the stored phase status signal.

3. The structure of claim 1, wherein said transition logic means comprises:

logic circuit means for forming output signals indicating each of four states of the phase status signal.

4. The structure of claim 3, wherein said resolver logic means comprises:
   means for forming pairs of output data bits in response to changes of the phase status signal between the four states of the phase status signal.

5. The structure of claim 1, wherein the status signal changes between one of four phase states in accordance with the data content of the incoming signal and further including:
   a. means for phase shifting the local reference signal to form a first local phase reference signal; and
   means for forming a second local phase reference signal in phase quadrature with said first local phase reference signal.

6. The structure of claim 5, wherein said phase detector means comprises:
   a. first detector means for demodulating the incoming signal with the first local phase reference signal to form a first phase status signal; and
   b. second detector means for demodulating the incoming signal with the second local phase reference signal to form a second phase status signal.

7. The structure of claim 6, wherein changes in the first and second phase status signals between successive reception intervals indicate data in the incoming signal and wherein said decision logic means comprises:
   a. first logic means for comparing the first phase status signal currently being formed with the first phase status signal received during the preceding reception interval; and
   b. second logic means for comparing the second phase status signal currently being formed with the second phase status signal received during the preceding reception interval.

* * * * *